(12) United States Patent
Ichiyama et al.

(10) Patent No.: US 7,957,458 B2
(45) Date of Patent: Jun. 7, 2011

(54) JITTER MEASUREMENT APPARATUS, JITTER MEASUREMENT METHOD, TEST APPARATUS AND ELECTRONIC DEVICE

(75) Inventors: Kiyotaka Ichiyama, Tokyo (JP); Masahiro Ishida, Tokyo (JP); Takahiro Yamaguchi, Tokyo (JP); Mani Soma, Seattle, WA (US)

(73) Assignee: Advantest Corporation, Tokyo (JP)

( * ) Notice: Subject to any disclaimer, the term of this patent is extended or adjusted under 35 U.S.C. 154(b) by 1482 days.

(21) Appl. No.: 11/378,407

(22) Filed: Mar. 17, 2006

(65) Prior Publication Data

US 2006/0182170 A1 Aug. 17, 2006

Related U.S. Application Data

(63) Continuation-in-part of application No. 11/057,707, filed on Feb. 14, 2005, now abandoned.

(51) Int. Cl.
*H04Q 1/20* (2006.01)

(52) U.S. Cl. .......................... 375/224; 375/226

(58) Field of Classification Search .............. 375/224, 375/226, 371, 227; 370/105.3, 516; 702/66, 702/79, 69–72; 348/497; 369/53.34; 714/700; 324/76.77, 765; 455/67.11, 115.1, 226.1
See application file for complete search history.

(56) References Cited

U.S. PATENT DOCUMENTS

| | | | | |
|---|---|---|---|---|
| 5,220,581 A * | 6/1993 | Ferraiolo et al. | ............. | 375/226 |
| 5,231,598 A * | 7/1993 | Vlahos | ............. | 714/700 |
| 5,557,196 A * | 9/1996 | Ujiie | ............. | 324/76.77 |
| 6,504,409 B1 * | 1/2003 | Laletin | ............. | 327/175 |
| 6,594,595 B2 * | 7/2003 | Yamaguchi et al. | ............. | 702/69 |
| 6,661,266 B1 * | 12/2003 | Variyam et al. | ............. | 327/159 |
| 6,859,027 B2 * | 2/2005 | Li et al. | ............. | 324/76.53 |
| 6,865,496 B2 * | 3/2005 | Camnitz et al. | ............. | 702/69 |
| 6,915,222 B2 * | 7/2005 | Tomita | ............. | 702/66 |
| 7,002,358 B2 * | 2/2006 | Wyatt | ............. | 324/622 |
| 7,158,899 B2 * | 1/2007 | Sunter et al. | ............. | 702/69 |
| 7,295,604 B2 * | 11/2007 | Cranford et al. | ............. | 375/226 |
| 7,412,341 B2 * | 8/2008 | Ichiyama et al. | ............. | 702/107 |
| 7,496,137 B2 * | 2/2009 | Ichiyama et al. | ............. | 375/226 |
| 7,778,319 B2 * | 8/2010 | Ichiyama et al. | ............. | 375/226 |
| 2001/0012320 A1 * | 8/2001 | Watanabe et al. | ............. | 375/226 |
| 2001/0038674 A1 * | 11/2001 | Trans | ............. | 375/355 |
| 2002/0176525 A1 * | 11/2002 | Yamaguchi et al. | ............. | 375/371 |
| 2003/0076181 A1 * | 4/2003 | Tabatabaei et al. | ............. | 331/57 |
| 2003/0215037 A1 * | 11/2003 | Chao et al. | ............. | 375/371 |
| 2004/0062301 A1 * | 4/2004 | Yamaguchi et al. | ............. | 375/226 |
| 2004/0091032 A1 * | 5/2004 | Duchi et al. | ............. | 375/224 |

(Continued)

OTHER PUBLICATIONS

Xia et al., Jitter Measurement Circuit for Mixed Signal Production Test, Dec. 20, 2005, ScienceDigest, pp. 272-282.*

(Continued)

*Primary Examiner* — Tesfaldet Bocure
*Assistant Examiner* — Lawrence B Williams
(74) *Attorney, Agent, or Firm* — Osha • Liang LLP

(57) ABSTRACT

A jitter measuring apparatus measures timing jitter of a signal-under-test. The jitter measuring apparatus includes a pulse generator for outputting a pulse signal of a predetermined pulse width for an edge of the signal-under-test, and a jitter measuring sub-unit for extracting the timing jitter on the basis of a duty ratio of each cycle of the signal output by the pulse generator.

18 Claims, 13 Drawing Sheets

U.S. PATENT DOCUMENTS

2007/0118314 A1* 5/2007 Ichiyama et al. ............ 702/69
2007/0211795 A1* 9/2007 Ichiyama et al. ............ 375/224
2007/0247181 A1* 10/2007 Ishida et al. ............ 324/765
2005/0031029 A1* 2/2005 Yamaguchi et al. ............ 375/226
2005/0111537 A1* 5/2005 Sunter et al. ............ 375/226
2005/0267696 A1* 12/2005 Yamaguchi et al. ............ 702/57

OTHER PUBLICATIONS

Yamaguchi et al., A Real-Time Jitter Measurement Board for High Performance Computer and Communication Systems, 2004, Test Conference, 2004, Proceedings, ITC 2004 International, pp. 7784.*

* cited by examiner

JITTER MEASUREMENT APPARATUS, JITTER MEASUREMENT METHOD, TEST APPARATUS AND ELECTRONIC DEVICE

BACKGROUND OF THE INVENTION

1. Field of the Invention

The present invention relates to a jitter measuring apparatus and a jitter measuring method for measuring timing jitter of a signal-under-test and a testing apparatus for testing a device-under-test.

2. Description of the Related Art

Conventionally, a method for comparing phase of a signal-under-test with that of a signal generated by delaying the signal-under-test by one period is known as a method for measuring jitter of a signal-under-test (T. Yamaguchi, "A Real-Time Jitter Measurement Board for High Performance Computer and Communication System", ITC2004). In case of delaying the signal-under-test by one period, phases of two adjacent rising edges of the signal-under-test are compared and thus period jitter of the signal-under-test is measured.

The above method outputs voltage corresponding to the amount of the period jitter of each cycle by inputting the signal-under-test and the delayed signal-under-test to a phase comparator. Further, by integrating the voltage output by the phase comparator using an integrator and the like, it is possible to measure the timing jitter of the signal-under-test in real-time.

However, the conventional method for measuring jitter requires delaying a signal-under-test accurately. For example, in case of measuring period jitter of the signal-under-test, it is required to delay the signal-under-test by one period accurately. However, in case there is an error in the delay time, the period jitter amount detected by the phase comparator becomes larger than a true period jitter amount due to the error in delay. Further, the error in measurement is accumulated by the integrator and the timing jitter output by the integrator is saturated before long.

Thus, the conventional method for measuring jitter requires a delay circuit in order to generate an accurate delay time. However, since it is difficult to make a delay circuit with highly accurate delay time, for the conventional method for measuring jitter it is difficult to measure the jitter of the signal-under-test precisely without being affected by the delay time error.

The conventional measuring method compares phase of a signal-under-test with that of a delayed signal. Thus, in case period-jitter amplitude of the signal-under-test is larger than one period of the signal-under-test, sometimes phases are compared between edges which do not correspond to each other and thus the jitter cannot be measured accurately.

SUMMARY OF THE INVENTION

Therefore, it is an object of the present invention to provide a jitter measuring apparatus and a jitter measuring method, which are capable of measuring jitter of a signal-under-test with good accuracy, and a testing apparatus, which is capable of testing a device-under-test with good accuracy. The above and other objects can be achieved by combinations described in the independent claims. The dependent claims define further advantageous and exemplary combinations of the present invention.

According to the first aspect of the present invention, a jitter measuring apparatus for measuring timing jitter of a signal-under-test is provided, wherein the jitter measuring apparatus includes a pulse generator for outputting a pulse signal of a predetermined pulse width for an edge of the signal-under-test, whose timing jitter is under test; and a jitter measuring sub-unit for estimating the timing jitter on the basis of a duty ratio of each cycle of the signal output by the pulse generator.

The jitter measuring apparatus may further include an integrator for outputting a signal-for-measuring-jitter whose signal level increases by a predetermined increasing rate while the signal output by the pulse generator shows H logic and decreases by a predetermined decreasing rate while the signal output by the pulse generator shows L logic, and the jitter measuring sub-unit may estimate the timing jitter on the basis of the signal level which the signal-for-measuring-jitter shows at timing of each edge of the pulse signal.

The jitter measuring sub-unit may estimate the timing jitter on the basis of each extreme value of variation in the signal level of the signal-for-measuring-jitter.

The integrator may generate the signal-for-measuring-jitter by the increasing and decreasing rates so that each extreme value of the signal-for-measuring-jitter is a predetermined signal level in case no timing jitter generated in the signal-under-test, and the jitter measuring sub-unit may estimate the timing jitter on the basis of a difference between each extreme value of the signal-for-measuring-jitter and the predetermined signal level.

The jitter measuring apparatus may further include a control section for controlling the increasing and decreasing rates on the basis of the pulse width of the pulse signal and an interval between the edges under test in case no timing jitter generated in the signal-under-test so that each extreme value of the signal-for-measuring-jitter is a predetermined signal level in case no timing jitter generated in the signal-under-test.

The control section may control the increasing and decreasing rates so that they satisfy the following equation:

$$a1 \times W + a2 \times (T-W) = 0$$

where, a1 is the increasing rate, a2 is the decreasing rate, W is the pulse width of the pulse signal, and T is an average period of the signal-under-test.

The control section may control the increasing and decreasing rates on the basis of a difference between the extreme value of the signal-for-measuring-jitter when a predetermined time passes from the time when the signal-for-measuring-jitter begins to be generated and the predetermined signal level.

Each of the increasing and decreasing rates can be set within a predetermined variable range, and the control section may set the increasing rate so that each extreme value of the signal-for-measuring-jitter is a predetermined signal level in case no timing jitter generated in the signal-under-test, and, in case the increasing rate cannot be set within the variable range, further control the decreasing rate to make the increasing rate be within the variable range.

The jitter measuring apparatus may further include a control section for controlling the pulse width on the basis of the increasing and decreasing rates of the integrator and an interval between the edges under test in case no timing jitter generated in the signal-under-test so that each extreme value of the signal-for-measuring-jitter is a predetermined signal level in case no timing jitter generated in the signal-under-test.

The integrator may include a current source for generating a source current determining the increasing rate; a current sink for generating a sink current determining the decreasing rate; a capacitor for generating a voltage level of the signal-for-measuring-jitter by being charged and discharge by the current source and the current sink; and a charge and discharge control section for charging the capacitor on the basis of the source current while the pulse signal shows the H logic and discharging the capacitor on the basis of the sink current while the pulse signal shows the L logic.

The jitter measuring apparatus may further include a control section for controlling the values of the source current and the sink current on the basis of the pulse width and the interval of the edges under test in case no timing jitter generated in the signal-under-test so that each extreme value of the signal-for-measuring-jitter is a predetermined signal level in case no timing jitter generated in the signal-under-test.

The pulse generator may output the pulse signal for every edge of the signal-under-test.

The pulse generator may output the pulse signal for a rising edge or a falling edge of the signal-under-test.

The jitter measuring sub-unit may include an averaging circuit for eliminating the predetermined high frequency components from the signal-for-measuring-jitter output by the integrator.

The jitter measuring sub-unit may include a sample-and-hold circuit for passing the signal-for-measuring-jitter while the signal output by the pulse generator shows the H level and holding the signal level of the signal-for-measuring-jitter while the signal output by the pulse generator shows the L level.

The jitter measuring sub-unit may include a sampling circuit for sampling the signal level of the signal-for-measuring-jitter according to the pulse signal output by the pulse generator.

According to the second aspect of the present invention, a jitter measuring method for measuring timing jitter of a signal-under-test is provided, wherein the method includes: a pulse generating step of outputting a pulse signal of a predetermined pulse width for an edge of the signal-under-test, whose timing jitter is under test; and a jitter measuring step of estimating the timing jitter on the basis of a duty ratio of each cycle of the signal output in the pulse generating step.

According to the third aspect of the present invention, a testing apparatus for testing a device-under-test is provided, wherein the testing apparatus includes: a jitter measuring apparatus for estimating timing jitter of a signal-under-test output by the device-under-test; and a determining section for determining pass/fail of the device-under-test on the basis of the timing jitter estimated by the jitter measuring apparatus, and the jitter measuring apparatus includes: a pulse generator for outputting a pulse signal of a predetermined pulse width for an edge of the signal-under-test, whose timing jitter is under test; and a jitter measuring sub-unit for estimating the timing jitter on the basis of a duty ratio of each cycle of the signal output by the pulse generator.

According to the fourth aspect of the present invention, an electronic device for outputting an output signal according to a received input signal is provided. The electronic device includes an operation circuit for receiving the input signal and outputting the output signal and a jitter measurement apparatus for measuring timing jitter of the output signal outputted by the operation circuit. The jitter measurement apparatus includes a pulse generator for outputting a pulse signal with a predetermined pulse width for an edge under test to measure the timing jitter of a signal-under-test and a jitter calculator for calculating the timing jitter based on a duty ratio for each cycle of the signal outputted by the pulse generator.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
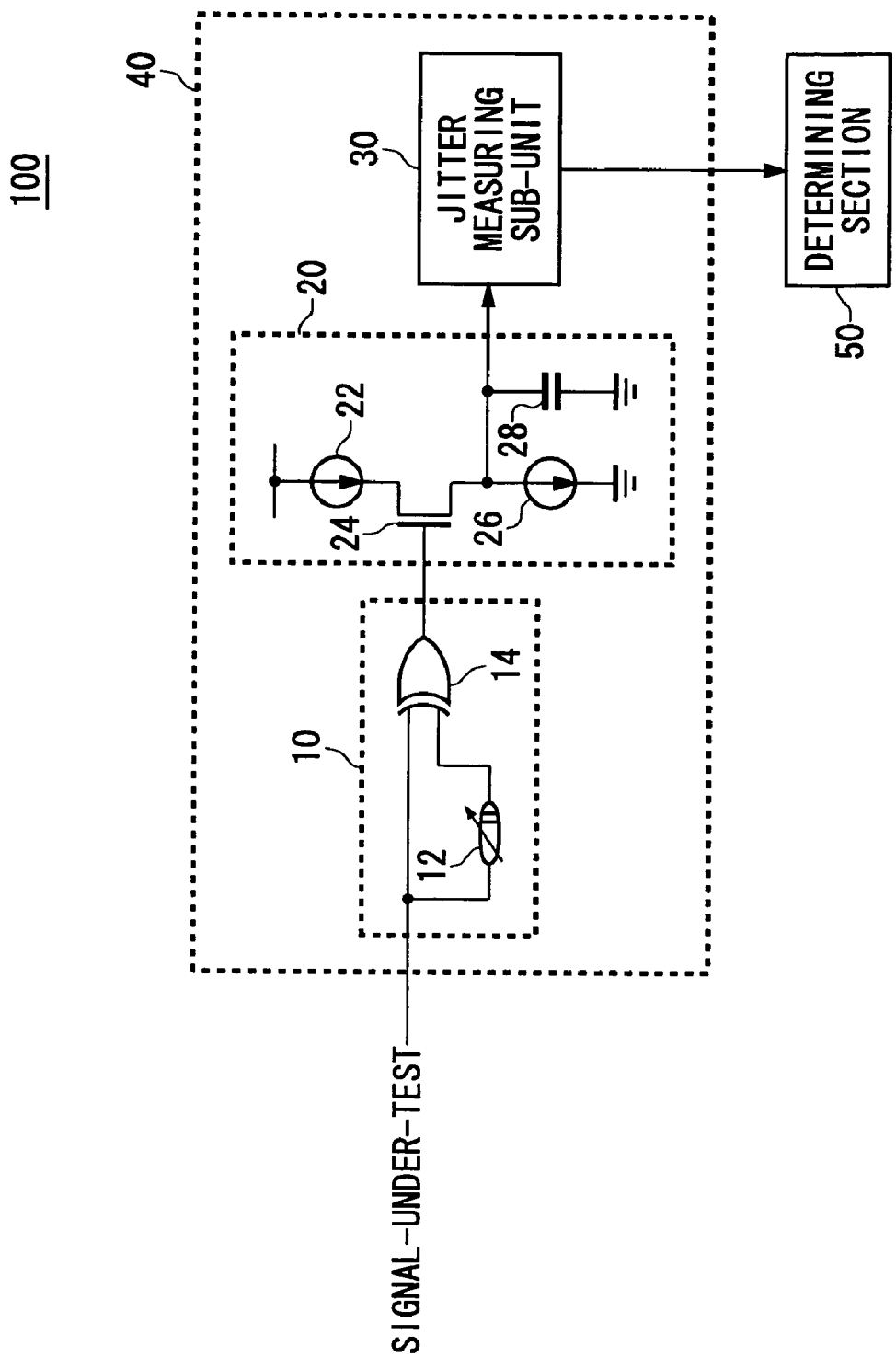
FIG. 1 is a block diagram showing an example of the configuration of a testing apparatus 100 according to an embodiment of the present invention.

FIG. 1 is a block diagram showing an example of the configuration of a testing apparatus 100 according to an embodiment of the present invention. The testing apparatus 100 determines a device-under-test ("DUT") pass/fail on the basis of a signal-under-test output by the DUT and includes a jitter measuring apparatus 40 and a determining section 50.

The jitter measuring apparatus 40 measures timing jitter of the signal-under-test. Further, the determining section 50 determines the DUT pass/fail on the basis of the timing jitter measured by the jitter measuring apparatus 40. For example, the determining section 50 determines the DUT pass/fail according to whether or not the amount of the timing jitter measured by the jitter measuring apparatus 40 is larger than a predetermined threshold value.

The jitter measuring apparatus 40 consists of a pulse generator 10, an integrator 20, and a jitter measuring sub-unit 30. The pulse generator 10 receives the signal-under-test and outputs a pulse of a predetermined pulse width for an edge of the signal-under-test, whose timing jitter is under test.

For example, in case of measuring the timing jitter of each edge of the signal-under-test, the pulse generator 10 outputs pulses of a predetermined pulse width for every edge of the signal-under-test. In this case, the pulse generator 10 may include a delay circuit 12 and an exclusive OR circuit 14 as shown in FIG. 1. The delay circuit 12 delays the signal-under-test by a predetermined delay time and outputs the delayed signal. Then, the exclusive OR circuit 14 outputs an exclusive OR of the signal-under-test and the delayed signal output by the delay circuit 12. By this, it is possible to generate a pulse of a pulse width determined by the delay time of the delay circuit 12 for every edge of the signal-under-test. Here, the delay circuit 12 may include constant delay time uniformly over a measurement period and thus an actual delay time may have an error compared with the predetermined setting of delay time.

Further, the pulse generator 10 may output a pulse for either a rising edge or a falling edge of the signal-under-test. In this case, it is possible to easily measure a period jitter between the rising edges or the falling edges. Further, the pulse generator 10 has a circuit configuration different from the configuration shown in FIG. 1. It can be easily realized that the pulse generator 10 generates a pulse for the rising edge or the falling edge of the signal-under-test by changing the circuit configuration of the pulse generator 10. In the following, it will be described on the case that the pulse generator 10 generates a pulse for all the edges of the signal-under-test.

The jitter measuring sub-unit 30 estimates (or measures) the timing jitter in the signal-under-test on the basis of a duty ratio of each cycle of the signal output by the pulse generator 10. In other words, for each cycle of the signal output by the pulse generator 10, the jitter measuring sub-unit 30 estimates the timing jitter in the signal-under-test on the basis of the ratio of the time interval over which the signal level is a H level to the time interval over which the signal level is an L level. Incase the signal-under-test has no timing jitter in itself, the duty ratio of the signal output by the pulse generator 10 is constant for each cycle. However, in case any timing jitter is included in the signal-under-test, the duty ratio of the signal output by the pulse generator 10 is not constant. Thus, it is possible to measure the timing jitter from the variation in the duty ratio. For example, the timing jitter of each edge may be measured by comparing the mean value of the duty ratio averaged over the entire cycles and the duty ratio for each cycle.

The jitter measuring sub-unit 30 according to the present example estimates the timing jitter in the signal-under-test on the basis of results of the integrator 20 integrating the pulses. The integrator 20 outputs a signal-for-measuring-jitter of a triangle wave generated by integrating the pulses output by the pulse generator 10. The integrator 20 according to the present example outputs signal-for-measuring-jitter whose signal level increases by a predetermined increasing rate while the signal output by the pulse generator 10 shows H logic and decreases by a predetermined decreasing rate while the signal output by the pulse generator 10 shows L logic. Here, the H logic means that the signal level of the signal output by the pulse generator 10 is either the H or L level. The L logic means that its signal level is different from that of the H logic. In the following, let the H logic be a state where the signal level is the H level and the L logic a state where the signal level is the L level.

The integrator 20 according to the present embodiment consists of a current source 22, a current sink 26, a capacitor 28, and a charge and discharge control section 24. The current source 22 generates a source current, which determines the increasing rate of the signal-for-measuring-jitter, and the current sink 26 generates a sink current, which determines the decreasing rate of the signal-for-measuring-jitter. The capacitor 28 is charged or discharged by the current source 22 or the current sink 26 and thus generates the signal-for-measuring-jitter. Further, the charge and discharge control section 24 charges the capacitor on the basis of the current generated by subtracting the sink current from the source current while the pulse signal shows the H logic and discharges the capacitor on the basis of the sink current while the pulse signal shows the L logic.

Figure 2:
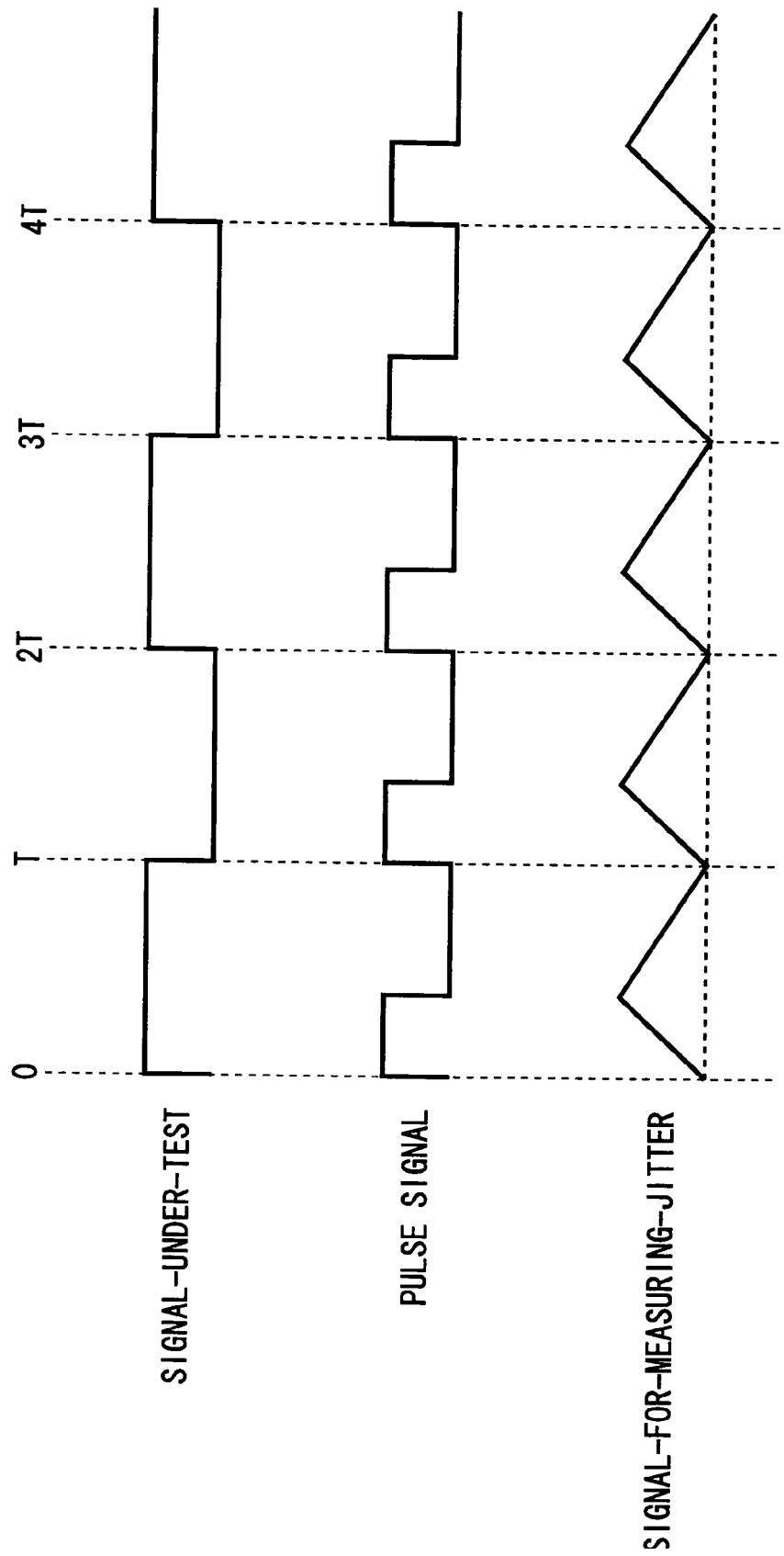
FIG. 2 shows an example of a waveform of a signal-for-measuring-jitter output by an integrator 20 for no timing jitter generated in a signal-under-test.

FIG. 2 shows an example of a waveform of the signal-for-measuring-jitter output by the integrator 20 for no timing jitter included in the signal-under-test. In case no timing jitter is included in the signal-under-test, the timing of each edge of the signal-under-test coincides with the half period of the signal-under-test (0, T, 2T, . . . ). The pulse generator 10 generates a pulse signal of the predetermined pulse width for each edge. Thus, the duty ratio of each cycle of the signal output by the pulse generator 10 is constant.

Further, the integrator 20 outputs the signal-for-measuring-jitter of a triangle wave, as described above. In case no timing jitter generated in the signal-under-test, the integrator 20 generates the signal-for-measuring-jitter showing a rate of increase or decrease so that each extreme value of the signal-for-measuring-jitter is a predetermined signal level. Consequently, in case of letting the pulse width of the pulse signal be W, the increasing rate of the signal-for-measuring-jitter be a1, and the decreasing rate of the signal-for-measuring-jitter be a2, the integrator 20 generates the signal-for-measuring-jitter which shows the increasing and decreasing rates satisfying the following equation:

$$a1 \times W + a2 \times (T-W) = 0 \qquad \text{Equation (1)}.$$

Thus, in case no timing jitter included in the signal-under-test, each of the local maximum value and the local minimum value in the signal-for-measuring-jitter shows a constant level.

Figure 3:
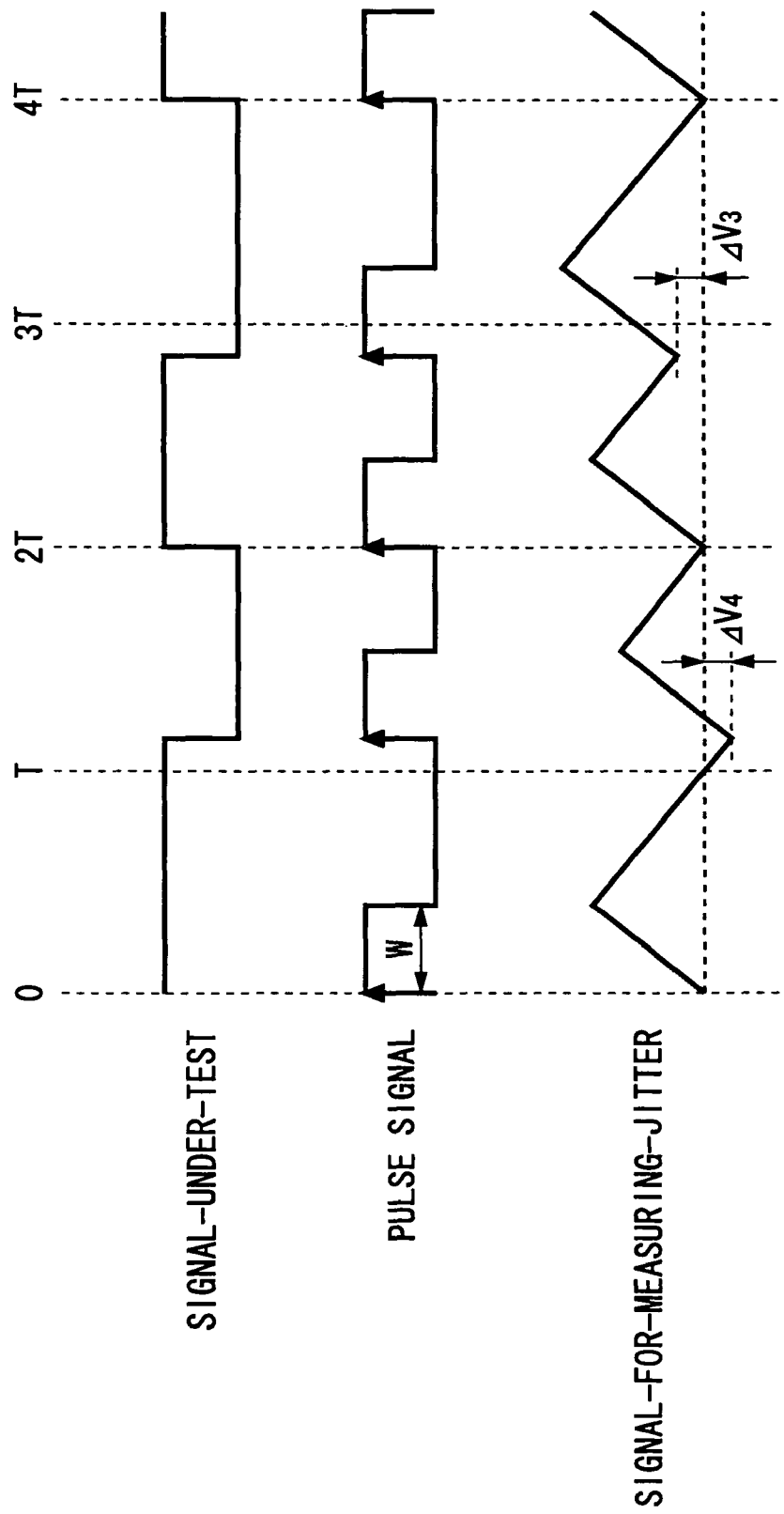
FIG. 3 shows an example of a waveform of a signal-for-measuring-jitter output by the integrator 20 for timing jitter generated in a signal-under-test.

FIG. 3 shows an example of a waveform of a signal-for-measuring-jitter output by the integrator 20 for timing jitter included in a signal-under-test. In case the timing jitter included in the signal-under-test, the timing of each edge of the signal-under-test does not coincide with the half period of the signal-under-test (0, T, 2T, . . . ) and the duty ratio of each cycle of the signal output by the pulse generator 10 is not constant.

Thus, as shown in FIG. 3, extreme values of the signal-for-measuring-jitter output by the integrator 20 do not become a predetermined value. The extreme values in signal-level variation of the signal-for-measuring-jitter deviate from a predetermined value by ($\Delta V1, \ldots, \Delta V3, \ldots$), which is obtained by multiplying the amount of jitter associated with the edge of the signal-under-test corresponding to the extreme value by the decreasing rate of the signal-for-measuring-jitter. The jitter measuring sub-unit 30 may extract the timing jitter on the basis of difference between a predetermined signal level and each extreme value in the signal-for-measuring-jitter which shows the edge timing of the pulse signal.

Further, it is preferable that the decreasing rate a2 of the signal-for-measuring-jitter output by the integrator 20 is constant. In other words, a downward inclined side of the signal-for-measuring-jitter is preferably a straight line. By this, since the difference ($\Delta V1, \ldots, \Delta V3, \ldots$) in level between each extreme value of the signal-for-measuring-jitter and the predetermined value is proportional to the amount of the jitter associated with the edge of the signal-under-test corresponding to the extreme value, it is possible to easily extract the timing jitter from the difference in level. Further, the increasing rate a1 of the signal-for-measuring-jitter output by the integrator 20 may not be constant. That is, the signal-for-measuring-jitter is only required to show constant increase in signal level during the time interval W over which the pulse signal is the H logic.

As described above, according to the jitter measuring apparatus of the present example, it is possible to easily extract the timing jitter of the signal-under-test. Further, even in case an error compared with the predetermined setting of delay time included in the delay circuit 12, it is possible to measure the timing jitter of the signal-under-test without being affected by the error if the delay circuit 12 includes a constant delay time.

Further, the configuration of the integrator 20 is not limited to the configuration shown in FIG. 1. For example, the integrator 20 may input a pulse signal to a positive input terminal of an operational amplifier via a resistor and apply a biased voltage to a negative input terminal, and an output terminal of the operational amplifier may be connected with the positive input terminal via a capacitor. This kind of integrating circuit can also generate a signal-for-measuring-jitter similarly. In this case, the rates of increase and decrease of the signal-for-measuring-jitter can be controlled by the biased voltage applied to the negative input terminal of the operational amplifier.

Further, the jitter measuring sub-unit 30 may calculate period jitter of a signal-under-test by estimating difference sequence from timing jitters measured in time sequence. For example, it is possible to estimate period jitter of a signal-under-test by estimating each difference between timing jitters which are adjacent in time sequence.

Figure 4:
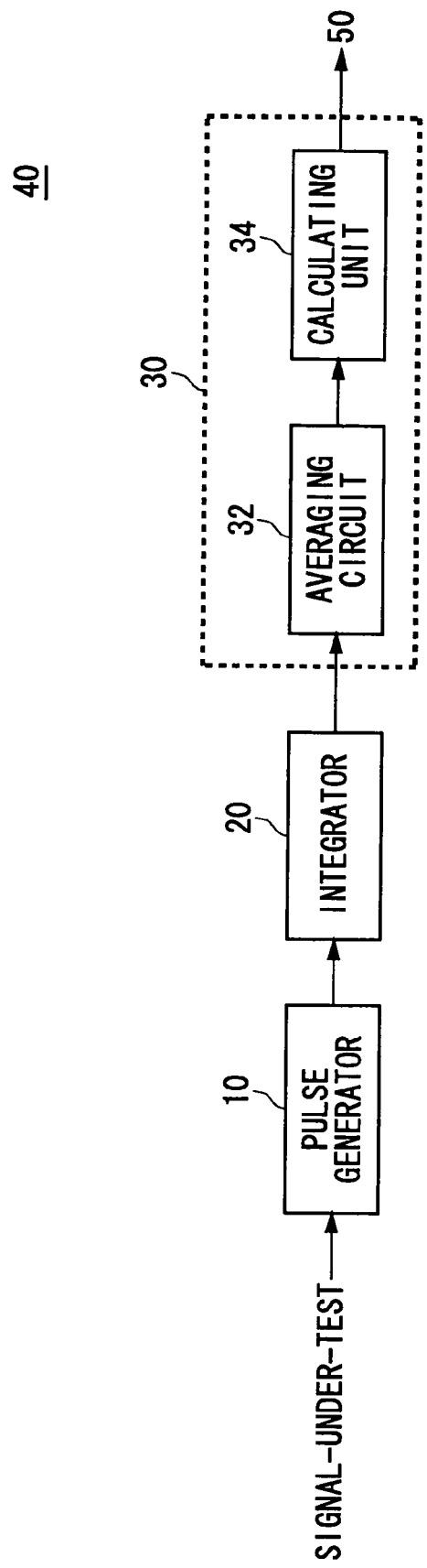
FIG. 4 is a block diagram showing an example of the configuration of a jitter measuring apparatus 40.

FIG. 4 is a block diagram showing an example of the configuration of the jitter measuring apparatus 40. The jitter measuring apparatus 40 according to the present example includes an averaging circuit 32 and a calculating unit 34 in the jitter measuring sub-unit 30. The averaging circuit 32 eliminates the predetermined high-frequency components from a signal-for-measuring-jitter. For example, the averaging circuit 32 may output a moving average value of timing jitter of a signal-for-measuring-jitter by averaging the signal-for-measuring-jitter over the time. Further, the averaging circuit 32 may output a moving average value of timing jitter by removing a component of a signal-for-measuring-jitter in case no timing jitter included in a signal-under-test from a signal-for-measuring-jitter output by the integrator 20. The averaging circuit 32 may realize the above function, for example, by using a low-pass filter.

Figure 5:
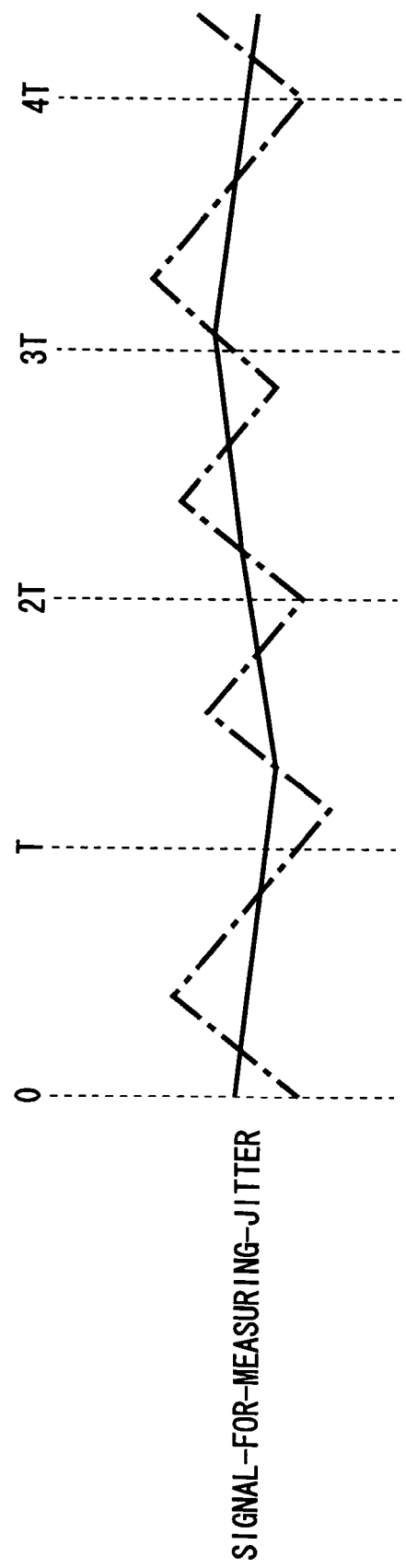
FIG. 5 shows an example of a waveform output by an averaging circuit 32.

FIG. 5 shows an example of a waveform output by the averaging circuit 32. In FIG. 5, a broken line shows a waveform of a signal-for-measuring-jitter output by the integrator 20 and a solid line shows a waveform output by the averaging circuit 32. As shown in FIG. 5, it is possible to get a moving average value of timing jitter by using the averaging circuit 32. The calculating unit 34 may estimate an rms value of the timing jitter and the like on the basis of the waveform.

Figure 6:
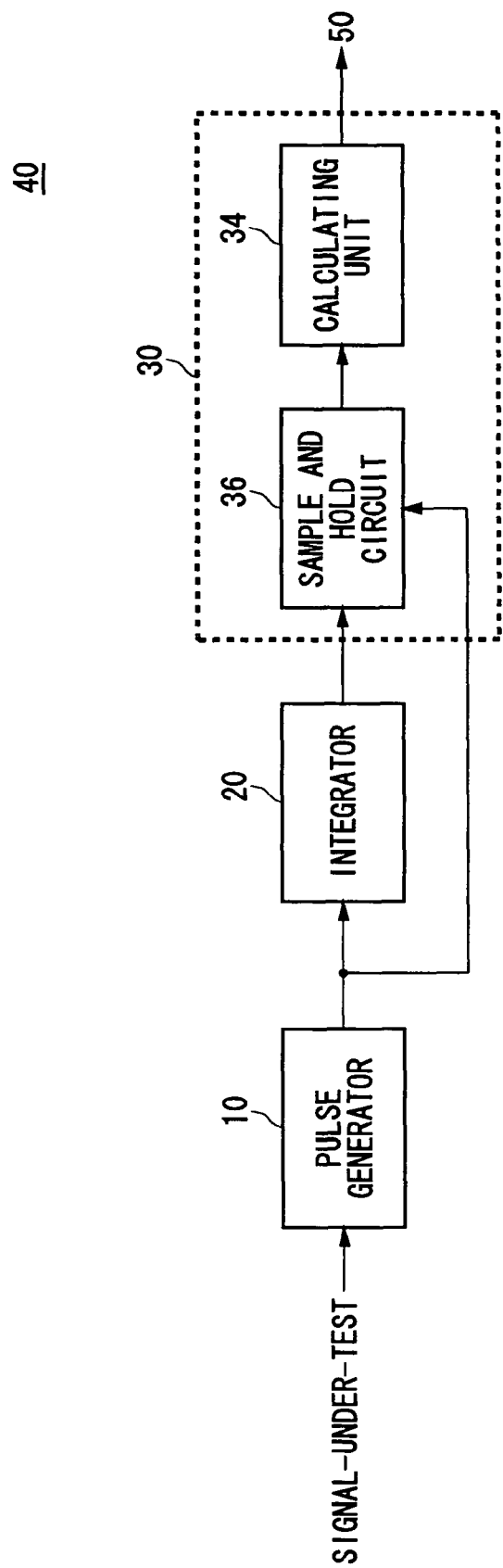
FIG. 6 is a block diagram showing another example of the configuration of the jitter measuring apparatus 40.

FIG. 6 is a block diagram showing another example of the configuration of the jitter measuring apparatus 40. The jitter measuring apparatus includes a sample-and-hold circuit 36 and a calculating unit 34 in the jitter measuring sub-unit. The sample-and-hold circuit 36 passes the signal-for-measuring-jitter to input to the calculating unit 34 while the signal output by the pulse generator 10 is the H logic, and holds the signal level of the signal-for-measuring-jitter to input to the calculating unit 34 while the signal output by the pulse generator 10 is the L logic.

Figure 7:
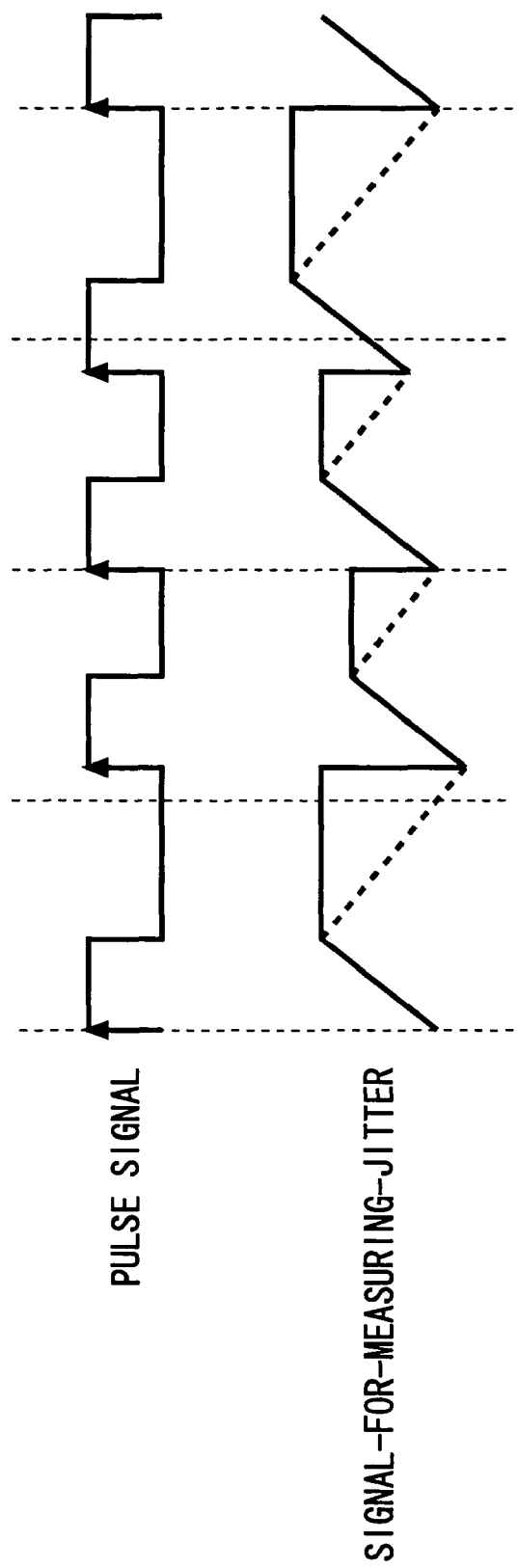
FIG. 7 shows an example of a waveform output by a sample-and-hold circuit 36.

FIG. 7 shows an example of a waveform output by the sample-and-hold circuit 36. In FIG. 7, a broken line shows a waveform of the signal-for-measuring-jitter output by the integrator 20 and the solid line shows a waveform output by the sample-and-hold circuit 36. As shown in FIG. 7, the sample-and-hold circuit 36 holds the voltage of an extreme value of the signal-for-measuring-jitter. Since the voltage of the extreme value is in a linear relation with corresponding timing jitter of an edge of the signal-under-test, it is possible to estimate the timing jitter from the voltage of the extreme value. Further, since the voltage of the extreme value is held and input to the calculating unit 34, the calculating unit 34 can easily detect the voltage of the extreme value.

Figure 8:
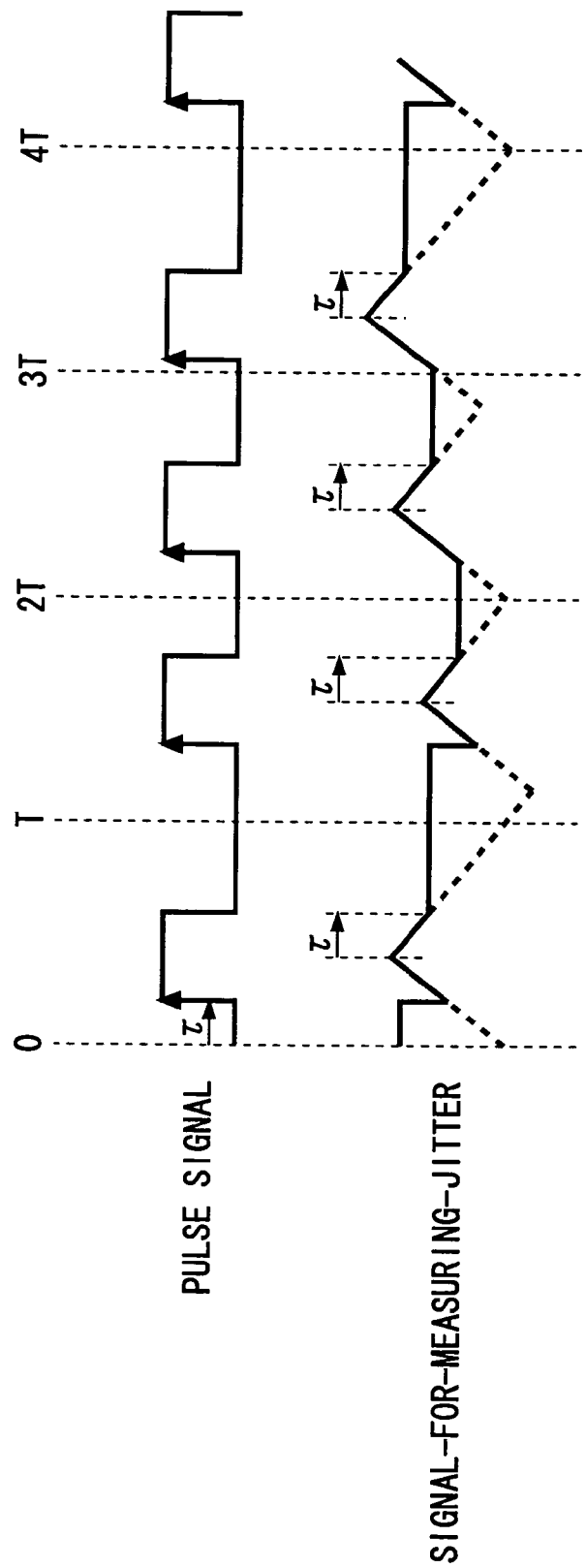
FIG. 8 describes voltage held by the sample-and-hold circuit 36 in case skew is included between a pulse signal and a signal-for-measuring-jitter input to the sample-and-hold circuit 36.

FIG. 8 illustrates voltage held by the sample-and-hold-circuit 36 in case skew is included between the pulse signal and the signal-for-measuring-jitter input to the sample-and-hold circuit 36. In this case, at a sampling point the sample-and-hold circuit 36 holds each voltage of the signal-for-measuring-jitter, whose extreme values are shifted by timing τ due to the skew. For each extreme value error associated with the held voltage due to the timing offset is a constant value because of the decreasing rate of the signal-for-measuring-jitter. Therefore, the error does not affect on the linear relationship between the timing jitter of the signal-under-test and a measured value of the timing jitter. Thus, the calculating unit 34 can extract the timing jitter of the signal-under-test easily and accurately.

Figure 9:
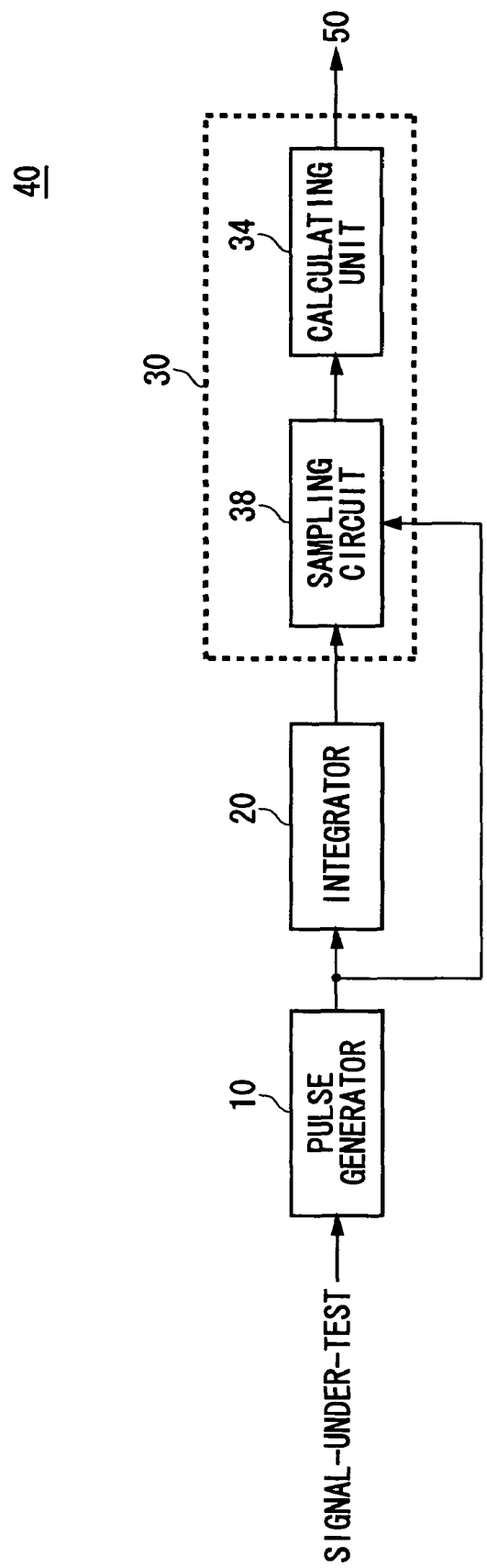
FIG. 9 is a block diagram showing another example of the configuration of the jitter measuring apparatus 40.

FIG. 9 is a block diagram showing another example of the configuration of the jitter measuring apparatus 40. The jitter measuring apparatus 40 according to the present example includes a sampling circuit 38 and a calculating unit 34 in the jitter measuring sub-unit 30. The sampling circuit 38 samples the signal level of the signal-for-measuring-jitter when the pulse signal is output by the pulse generator 10. The sampling circuit 38 may be an analog-to-digital converter for sampling the signal-for-measuring-jitter, for example, at timing of a rising edge of the pulse signal and inputting the value of the sampled voltage to the calculating unit 34. The voltage value input to the calculating unit 34 by the sampling circuit 38 is similar to the voltage value input to the calculating unit 34 by the sample-and-hold circuit 36 explained in FIG. 6. Thus, the calculating unit 34 can extract the timing jitter of the signal-under-test easily and accurately.

Figure 10:
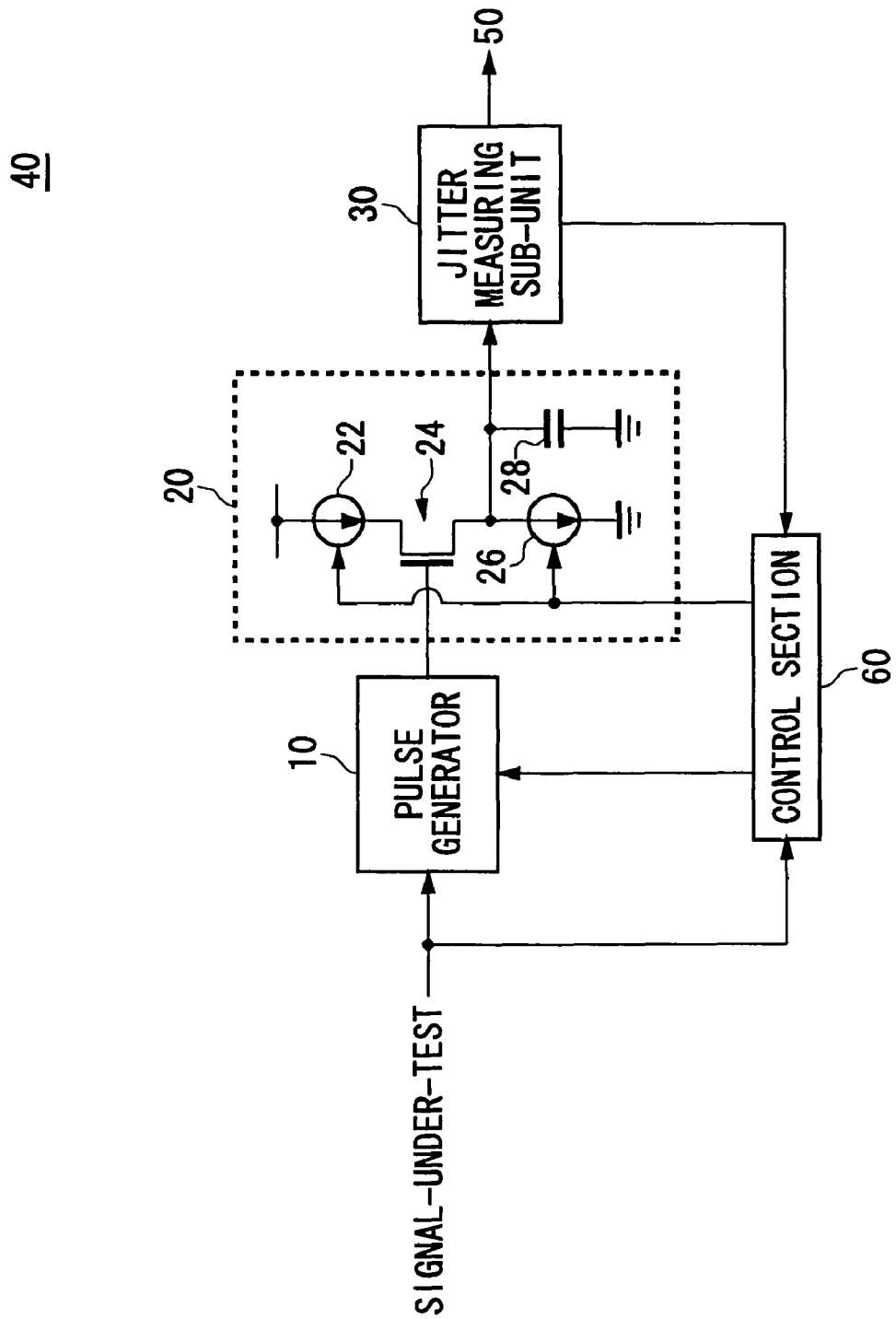
FIG. 10 is a block diagram showing another example of the configuration of the jitter measuring apparatus 40.

FIG. 10 is a block diagram showing another example of the configuration of the jitter measuring apparatus 40. The jitter measuring apparatus 40 of the present example further includes a control section 60 in addition to the configuration of the jitter measuring apparatus 40 explained in FIG. 1. Before measuring timing jitter of the signal-under-test the control section 60 controls pulse width of the pulse signal output by the pulse generator 10, the increasing and decreasing rates of the signal-for-measuring-jitter output by the integrator 20 so that each extreme value of the signal-for-measuring-jitter becomes a predetermined signal level for no timing jitter included in the signal-under-test.

For example, in case pulse width of the pulse signal output by the pulse generator 10 fixed, the control section 60 controls the increasing and decreasing rates of the signal-for-measuring-jitter on the basis of the pulse width and interval between edges-under-test in case no timing jitter included in the signal-under-test so that each extreme value of the signal-for-measuring-jitter becomes a predetermined signal level in case no timing jitter included in the signal-under-test.

The pulse width of the pulse signal may be measured by the control section 60 or estimated on the basis of the delay of the delay circuit 12. Further, the interval between edges-under-test in case no timing jitter included in the signal-under-test may be applied to the control section 60 or estimated by the control section 60 by measuring an average period of the signal-under-test. By estimating the average period of the signal-under-test over a sufficiently long time interval, it is possible to reduce the influence of the timing jitter of the signal-under-test and estimate the average period accurately. Further, the interval between edges-under-test can be easily estimated from the average period. The control section 60 controls the increasing and decreasing rates of the signal-for-measuring-jitter on the basis of the estimated value so that the increasing and decreasing rates satisfy the equation (1). It is possible to adjust the increasing and decreasing rates, for example, by controlling the values of source current and sink current of the integrator 20.

In case the control section 60 controls the increasing and decreasing rates of the signal-for-measuring-jitter, it is desirable that the control section 60 controls the increasing rate first because the decreasing rate of the signal-for-measuring-jitter determines gain of the measured value of the timing jitter with respect to the timing jitter of the signal-under-test as explained in FIG. 3.

Further, since a range of the amount of current which can be generated by the current source 22 and the current sink 26 is limited, each of the increasing and decreasing rates of the signal-for-measuring-jitter can be set within a predetermined variable range. In case the increasing rate cannot be within the variable range when the control section 60 sets the increasing rate so that each extreme value of the signal-for-measuring-jitter is a predetermined signal level in case no timing jitter generated in the signal-under-test, the control section 60 may further control the decreasing rate and thus make the increasing rate be within the variable range. By this kind of control, it is possible to prevent the gain of the measured value of the timing jitter from changing.

Further, in case increasing and decreasing rates of the signal-for-measuring-jitter are fixed, the control section 60 controls pulse width of the pulse signal output by the pulse generator 10 on the basis of the interval between edges-under-test and the given increasing and decreasing rates so that each extreme value of the signal-for-measuring-jitter is a predetermined signal level for no timing jitter included in the signal-under-test. The increasing and decreasing rates of the signal-for-measuring-jitter can be easily estimated, for example, from the values of the source current and the sink current and capacity of the capacitor 28. Further, the interval of edges-under-test can be estimated as described above. The control section 60 controls the pulse width W so that the pulse width W satisfies the equation (1) on the basis the above estimated values. The pulse width W can be easily adjusted, for example, by controlling the delay of the delay circuit 12 of the pulse generator 10.

Further, the control section 60 may control the pulse width of the pulse signal, the increasing and decreasing rates of the signal-for-measuring-jitter on the basis of the level difference between the extreme value of the signal-for-measuring-jitter and a predetermined signal level estimated by the jitter measuring sub-unit 30 without providing the pulse generator 10 with the signal-under-test for a sufficiently long time.

Figure 11:
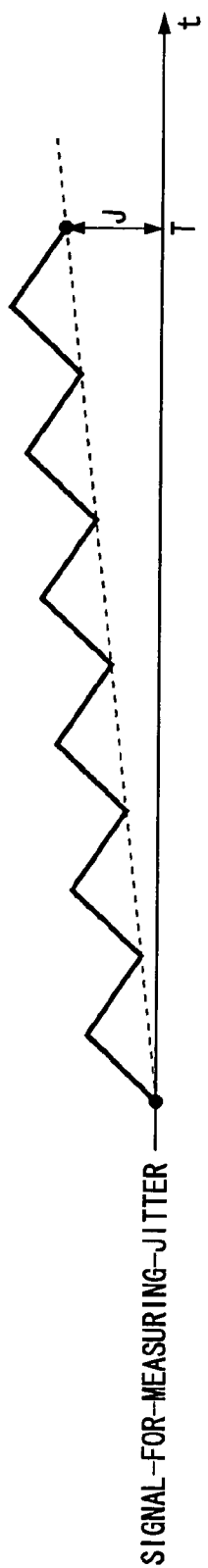
FIG. 11 shows an example of a waveform of a signal-for-measuring-jitter in a state where the pulse width of a pulse signal, the rates of increase and decrease of the signal-for-measuring-jitter are not controlled.

FIG. 11 shows an example of a waveform of the signal-for-measuring-jitter in a state where the pulse width of the pulse signal, the increasing and decreasing rates of the signal-for-measuring-jitter are not controlled. In case the pulse width of the pulse signal, the increasing and decreasing rates of the signal-for-measuring-jitter are not controlled, the extreme value of the signal-for-measuring-jitter does not coincide with a predetermined signal level and the difference between the extreme value and the predetermined signal level is accumulated as shown in FIG. 11.

By measuring a difference in level after a sufficiently long time, it is possible to reduce the influence of the timing jitter of the signal-under-test to the difference in level. In other words, the difference in level is caused by errors in setting the pulse width of the pulse signal, the increasing and decreasing rates of the signal-for-measuring-jitter. Then, it is possible to estimate the difference in level generated per a cycle of the signal-for-measuring-jitter by dividing the difference in level by the number of cycles of the signal-for-measuring-jitter within the measurement period. The control section 60 may determine values to which the pulse width of the pulse signal, the increasing and decreasing rates of the signal-for-measuring-jitter are to be set from the difference in level generated per a cycle.

Further, the control section 60 may provide the pulse generator 10 with the signal-under-test until the signal level of the extreme vale of the signal-for-measuring-jitter is saturated. Since the signal level of the signal-for-measuring-jitter is generated by the capacitor 28, the signal level of the signal-for-measuring-jitter is saturated according to the capacitance of the capacitor 28. The control section 60 may determine values to which the pulse width of the pulse signal, the increasing and decreasing rates of the signal-for-measuring-jitter are to be set on the basis of the difference in level between the extreme value of the signal-for-measuring-jitter and the predetermined signal level when the signal level of the signal-for-measuring-jitter is saturated and the time taken for the signal level of the signal-for-measuring-jitter to be saturated. By this, it is possible to maximize the measurement period and perform measurement of the difference in level while minimizing the influence of the timing jitter of the signal-under-test.

Figure 12:
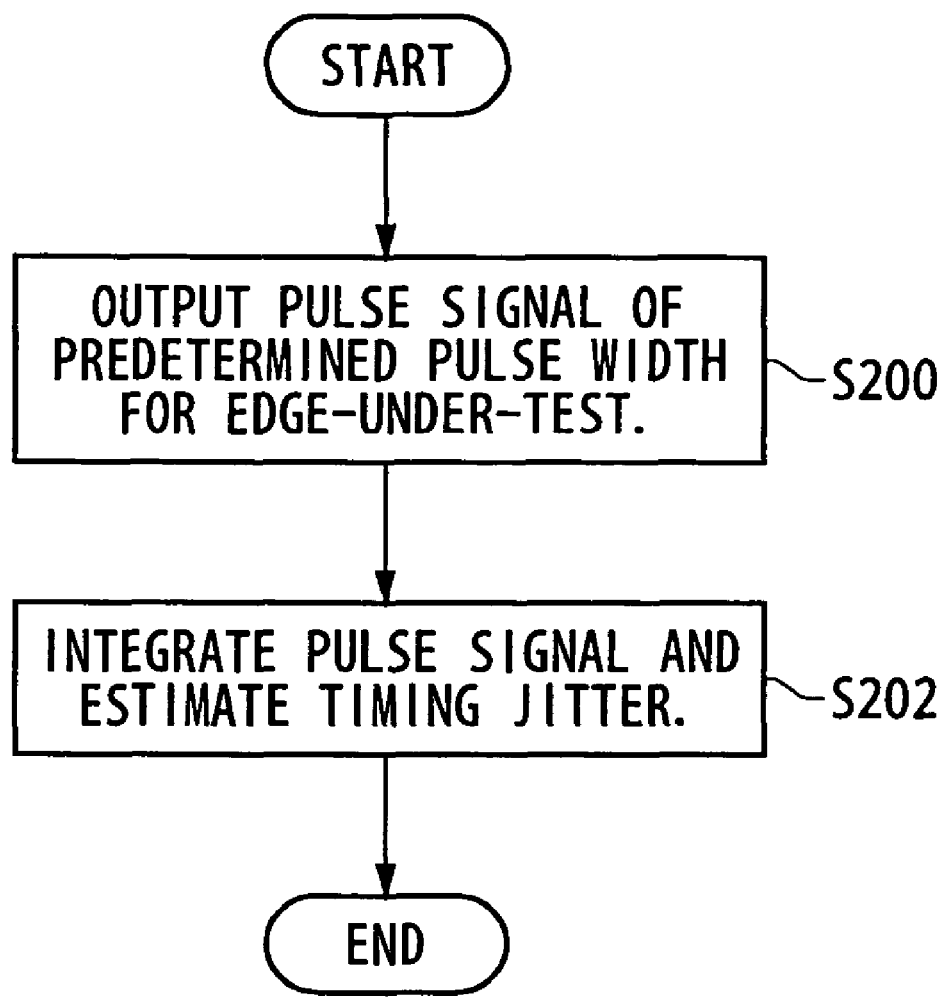
FIG. 12 is a flowchart showing a method for measuring timing jitter of a signal-under-test.

FIG. 12 is a flowchart showing a method for measuring timing jitter of a signal-under-test. The method of measurement performs measurement of the timing jitter in the same way as the jitter measuring apparatus described in FIGS. 1 to 11. First, in a pulse generating step S200, a pulse of a predetermined pulse width is output for an edge of the signal-under-test, whose timing jitter is under test. The detailed operation of the step S200 is similar to that of the pulse generator 10 described in FIGS. 1 to 11. Then, in a jitter estimating step S202, the pulse output in the pulse generating step S200 is integrated and the timing jitter is extracted on the basis of the duty ratio of each cycle of the pulse generated in the pulse generating step S200. The detailed operation of the step S202 is similar with that of the integrator 20, the jitter measuring sub-unit 30, and the control section 60 described with respect to FIGS. 1 to 11.

Figure 13:
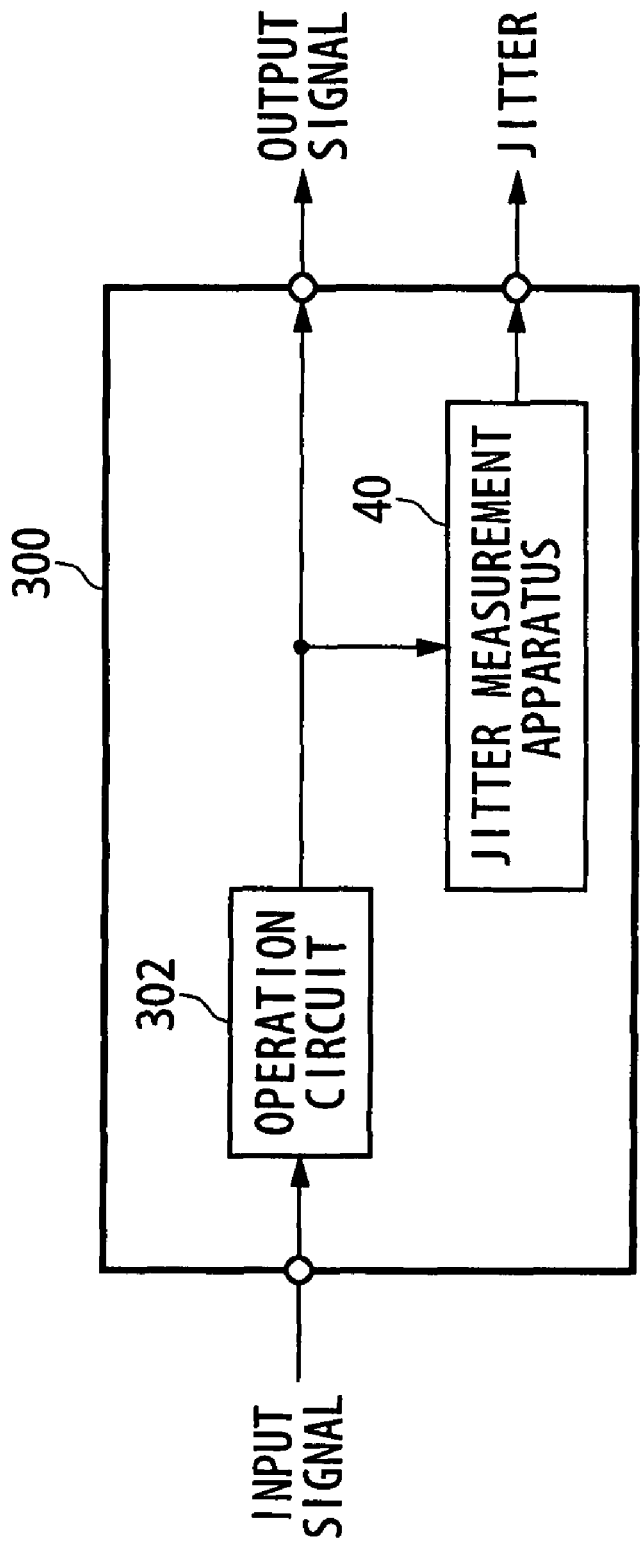
FIG. 13 is a block diagram showing an example of the configuration of an electronic device 300 according to an embodiment of the present invention.

FIG. 13 is a block diagram showing an example of the configuration of an electronic device 300 according to an embodiment of the present invention. The electronic device 300 includes an operation circuit 302 and a jitter measurement apparatus 40. The operation circuit 302 and the jitter measurement apparatus 40 may be provided on one semiconductor chip. The operation circuit 302 may be a semiconductor circuit, which outputs an output signal according to the inputted input signal.

The jitter measurement apparatus 40 measures timing jitter of the output signal outputted by the operation circuit 302. The jitter measurement apparatus 40 may output outside the measurement result. Additionally, the electronic device 300 may include the test apparatus 100 instead of the jitter measurement apparatus 400. In this case, the test apparatus 100 determines pass/fail of the operation circuit based on the timing jitter of the output signal from the operation circuit 302. The test apparatus 100 may output outside the result.

Additionally, the jitter measurement apparatus 40 may measure timing jitter of a signal generated inside the operation circuit 302.

Although the present invention has been described by way of exemplary embodiments, it should be understood that those skilled in the art might make many changes and substitutions without departing from the spirit and the scope of the present invention which is defined only by the appended claims.

As clear from the above description, according to the present invention, it is possible to estimate timing jitter of a signal-under-test easily and accurately. Further, even in delay error is generated in a delay circuit, it is possible to estimate timing jitter accurately.

What is claimed is:

1. A jitter measuring apparatus for measuring timing jitter of a signal-under-test comprising:
    a pulse generator for receiving the signal-under-test and outputting a pulse signal of a predetermined pulse width for an edge of the signal-under-test, whose timing jitter is under test;
    a jitter measuring sub-unit for extracting the timing jitter on the basis of a duty ratio of each cycle of the signal output by said pulse generator; and
    an integrator for outputting a signal-for-measuring-jitter whose signal level increases by a predetermined increasing rate while the signal output by said pulse generator shows logic high, or H logic, and decreases by a predetermined decreasing rate while the signal output by said pulse generator shows logic low, or L logic,
    wherein said jitter measuring sub-unit extracts the timing jitter on the basis of the signal level which the signal-for-measuring-jitter shows at timing of each edge of the pulse signal.

2. A jitter measuring apparatus as claimed in claim 1, wherein said jitter measuring sub-unit extracts the timing jitter on the basis of each extremum of the signal-for -measuring-jitter.

3. A jitter measuring apparatus as claimed in claim 1, wherein
    said integrator generates the signal-for-measuring-jitter by the increasing and decreasing rates so that each extremum of the signal-for-measuring-jitter is a predetermined signal level in a case of no timing jitter generated in the signal-under-test, and
    said jitter measuring sub-unit extracts the timing jitter on the basis of a difference between each extremum of the signal-for-measuring-jitter and the predetermined signal level.

4. A jitter measuring apparatus as claimed in claim 3 further comprising a control section for controlling the increasing and decreasing rates on the basis of the pulse width of the pulse signal and an interval between the edges under test in a case of no timing jitter included in the signal-under-test so that each extremum of the signal-for-measuring-jitter is a predetermined signal level in a case of no timing jitter included in the signal-under-test.

5. A jitter measuring apparatus as claimed in claim 4, wherein said control section controls the increasing and decreasing rates so that they substantially satisfy the following equation:

$$a1 \times W + a2 \times (T-W) = 0$$

where, a1 is the increasing rate, a2 is the decreasing rate, W is the pulse width of the pulse signal, and T is an average period of the signal-under-test.

6. A jitter measuring apparatus as claimed in claim 4, wherein said control section controls the increasing and decreasing rates on the basis of a difference between the extremum of the signal-for-measuring-jitter when a predetermined time passes from the time when the signal-for-measuring-jitter begins to be generated and the predetermined signal level.

7. A jitter measuring apparatus as claimed in claim 4, wherein
    each of the increasing and decreasing rates can be set within a predetermined variable range, and
    said control section sets the increasing rate so that each extremum of the signal-for -measuring -jitter is a predetermined signal level in a case of no timing jitter included in the signal-under-test and, in a case where the increasing rate cannot be set within the variable range, further controls the decreasing rate to make the increasing rate be within the variable range.

8. A jitter measuring apparatus as claimed in claim 1 further comprising a control section for controlling the pulse width on the basis of the increasing and decreasing rates of said integrator and an interval between the edges under test in a case of no timing jitter generated in the signal-under-test so that each extremum of the signal-for-measuring-jitter is a predetermined signal level in a case of no timing jitter included in the signal-under-test.

9. A jitter measuring apparatus as claimed in claim 3, wherein said integrator comprises:
    a current source for generating a source current determining the increasing rate;
    a current sink for generating a sink current determining the decreasing rate;
    a capacitor for generating a voltage level of the signal-for-measuring-jitter by being charged and discharged by said current source and said current sink; and
    a charge and discharge control section for charging said capacitor on the basis of the source current while the pulse signal shows the H logic and discharging said capacitor on the basis of the sink current while the pulse signal shows the L logic.

10. A jitter measuring apparatus as claimed in claim 9 further comprising a control section for controlling the values of the source current and the sink current on the basis of the pulse width and the interval of the edges under test in a case of no timing jitter included in the signal-under-test so that each extremum of the signal-for-measuring-jitter is a predetermined signal level in a case of no timing jitter included in the signal-under-test.

11. A jitter measuring apparatus as claimed in claim 1, wherein said pulse generator outputs the pulse signal for every edge of the signal-under-test.

12. A jitter measuring apparatus as claimed in claim 1, wherein said pulse generator outputs the pulse signal for only rising edges or only falling edges of the signal-under-test.

13. A jitter measuring apparatus as claimed in claim 1, wherein said jitter measuring sub-unit comprises an averaging circuit for eliminating a predetermined high-frequency component from the signal-for-measuring-jitter output by said integrator.

14. A jitter measuring apparatus as claimed in claim 1, wherein said jitter measuring sub-unit comprises a sample-and-hold circuit for passing the signal-for-measuring -jitter while the signal output by said pulse generator shows the H logic and holding the signal level of the signal-for-measuring-jitter while the signal output by said pulse generator shows the L logic.

15. A jitter measuring apparatus as claimed in claim 1, wherein said jitter measuring sub-unit comprises a sampling circuit for sampling the signal level of the signal-for-measuring-jitter according to the pulse signal output by said pulse generator.

16. A jitter measuring method for measuring timing jitter of a signal-under-test comprising:
- a pulse generating step of receiving the signal-under-test and outputting a pulse signal of a predetermined pulse width for an edge of the signal-under-test, whose timing jitter is under test;
- a jitter measuring step of extracting the timing jitter on the basis of a duty ratio of each cycle of the signal output in said pulse generating step; and
- an integrating step of outputting a signal-for-measuring-jitter whose signal level increases by a predetermined increasing rate while the signal output in said pulse generating step shows logic high, or H logic, and decreases by a predetermined decreasing rate while the signal output in said pulse generating step shows logic low, or L logic,
- wherein, in said jitter measuring step, the timing jitter is extracted on the basis of the signal level which the signal-for-measuring-jitter shows at timing of each edge of the pulse signal.

17. A testing apparatus for testing a device-under-test comprising:
- a jitter measuring apparatus for estimating timing jitter of a signal-under-test output by the device-under-test; and
- a determining section for determining pass/fail of the device-under-test on the basis of the timing jitter estimated by said jitter measuring apparatus,
- wherein said jitter measuring apparatus comprises:
  - a pulse generator for receiving the signal-under-test and outputting a pulse signal of a predetermined pulse width for an edge of the signal-under-test, whose timing jitter is under test;
  - a jitter measuring sub-unit for extracting the timing jitter on the basis of a duty ratio of each cycle of the signal output by said pulse generator; and
  - an integrator for outputting a signal-for-measuring-jitter whose signal level increases by a predetermined increasing rate while the signal output by said pulse generator shows logic high, or H logic, and decreases by a predetermined decreasing rate while the signal output by said pulse generator shows logic low, or L logic,
  - wherein said jitter measuring sub-unit extracts the timing jitter on the basis of the signal level which the signal-for-measuring-jitter shows at timing of each edge of the pulse signal.

18. An electronic device for outputting an output signal according to a received input signal, comprising:
- an operation circuit for receiving the input signal and outputting the output signal; and
- a jitter measurement apparatus for measuring timing jitter of the output signal outputted by the operation circuit,
- wherein the jitter measurement apparatus comprises:
  - a pulse generator for receiving a signal-under-test and outputting a pulse signal with a predetermined pulse width for an edge of the output signal to measure the timing jitter of the output signal;
  - a jitter calculator for calculating the timing jitter based on a duty ratio for each cycle of the signal outputted by the pulse generator; and
  - an integrator for outputting a signal-for-measuring-jitter whose signal level increases by a predetermined increasing rate while the signal output by said pulse generator shows logic high, or H logic, and decreases by a predetermined decreasing rate while the signal output by said pulse generator shows logic low, or L logic,
  - wherein said jitter calculator extracts the timing jitter on the basis of the signal level which the signal-for-measuring-jitter shows at timing of each edge of the pulse signal.

* * * * *